United States Patent
Rakshit et al.

(10) Patent No.: US 10,921,595 B2
(45) Date of Patent: Feb. 16, 2021

(54) CONTEXTUAL ADJUSTMENT TO AUGMENTED REALITY GLASSES

(71) Applicant: International Business Machines Corporation, Armonk, NY (US)

(72) Inventors: Sarbajit K. Rakshit, Kolkata (IN); Martin G. Keen, Cary, NC (US); John M. Ganci, Jr., Cary, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/023,958

(22) Filed: Jun. 29, 2018

(65) Prior Publication Data

US 2020/0004017 A1    Jan. 2, 2020

(51) Int. Cl.
| G02B 27/01 | (2006.01) |
| G02B 27/00 | (2006.01) |
| G06F 3/0346 | (2013.01) |
| H04N 5/262 | (2006.01) |

(52) U.S. Cl.
CPC ..... *G02B 27/0172* (2013.01); *G02B 27/0093* (2013.01); *G06F 3/0346* (2013.01); *H04N 5/2628* (2013.01); *G02B 2027/0158* (2013.01); *G02B 2027/0178* (2013.01); *G02B 2027/0187* (2013.01)

(58) Field of Classification Search
CPC ............ G02B 27/0093; G02B 27/0172; G02B 2027/0158; G02B 2027/0178; G02B 2027/0187; G06F 3/0346; H04N 5/2628
See application file for complete search history.

(56) References Cited

U.S. PATENT DOCUMENTS

| 7,365,706 B2 | 4/2008 | Shimoyama et al. |
| 10,165,028 B2 | 12/2018 | Moustafa et al. |
| 2002/0044152 A1* | 4/2002 | Abbott, III .............. G06T 11/00 345/629 |
| 2006/0103591 A1* | 5/2006 | Tanimura .............. G06F 1/3218 345/8 |

(Continued)

FOREIGN PATENT DOCUMENTS

DE    102014225222 A1    6/2016

*Primary Examiner* — Mihir K Rayan
(74) *Attorney, Agent, or Firm* — Edward J. Wixted, III

(57) ABSTRACT

A computing device includes an interface configured to interface and communicate with augmented reality glasses associated with a user, a memory that stores operational instructions, and processing circuitry operably coupled to the interface and to the memory that is configured to execute the operational instructions to perform various operations. The computing device receives the information that is related to the position and/or movement of the augmented reality glasses with respect to the user from monitoring component(s) of the augmented reality glasses. The computing device processes that information to determine the position and/or the movement of the augmented reality glasses with respect to the user. The computing device transmits media to the reality display of the augmented reality glasses to be consumed by the user and modify at least a portion of the media based on the position and/or movement of the augmented reality glasses with respect to the user.

17 Claims, 9 Drawing Sheets

(56) References Cited

U.S. PATENT DOCUMENTS

| | | | |
|---|---|---|---|
| 2010/0110368 A1* | 5/2010 | Chaum | G02C 11/10 |
| | | | 351/158 |
| 2011/0080289 A1 | 4/2011 | Minton | |
| 2013/0038510 A1* | 2/2013 | Brin | G02B 27/017 |
| | | | 345/8 |
| 2013/0088507 A1* | 4/2013 | White | G02B 27/017 |
| | | | 345/592 |
| 2013/0235169 A1* | 9/2013 | Kato | G02B 27/01 |
| | | | 348/53 |
| 2013/0265261 A1* | 10/2013 | Min | G09G 5/006 |
| | | | 345/173 |
| 2014/0104143 A1* | 4/2014 | Benson | G02B 27/017 |
| | | | 345/8 |
| 2014/0160170 A1 | 6/2014 | Lyons | |
| 2014/0198017 A1* | 7/2014 | Lamb | G02B 27/017 |
| | | | 345/8 |
| 2014/0247286 A1 | 9/2014 | Chi | |
| 2014/0375680 A1 | 12/2014 | Ackerman et al. | |
| 2016/0034032 A1* | 2/2016 | Jeong | G06T 19/006 |
| | | | 345/156 |
| 2016/0337506 A1 | 11/2016 | Bjontegard | |
| 2019/0362560 A1 | 11/2019 | Choi et al. | |

* cited by examiner

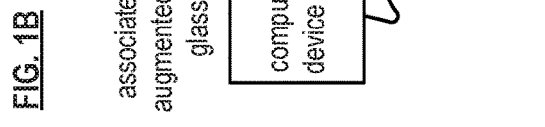
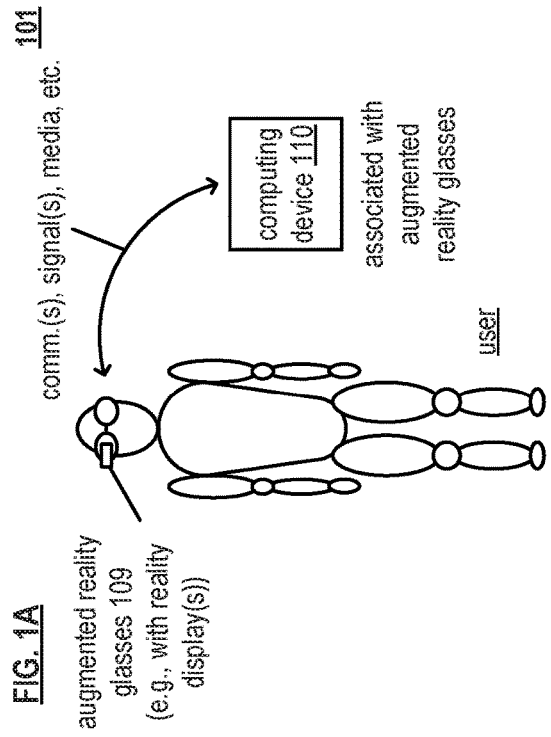
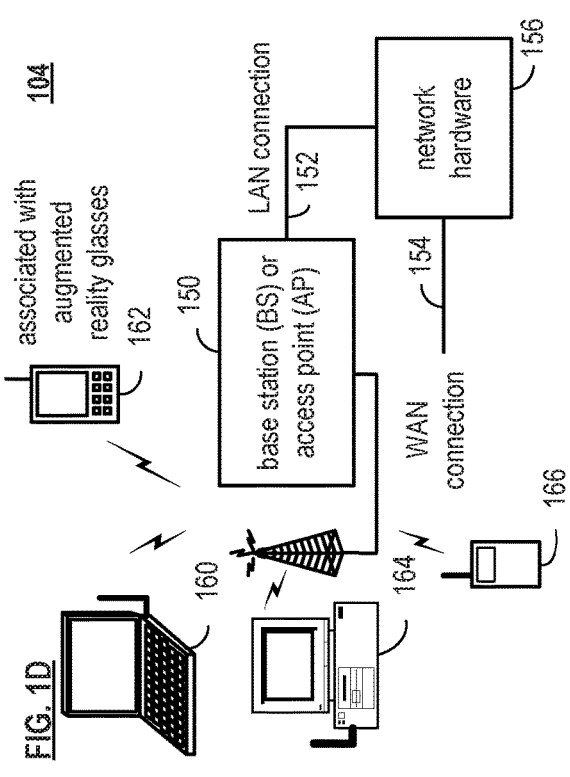
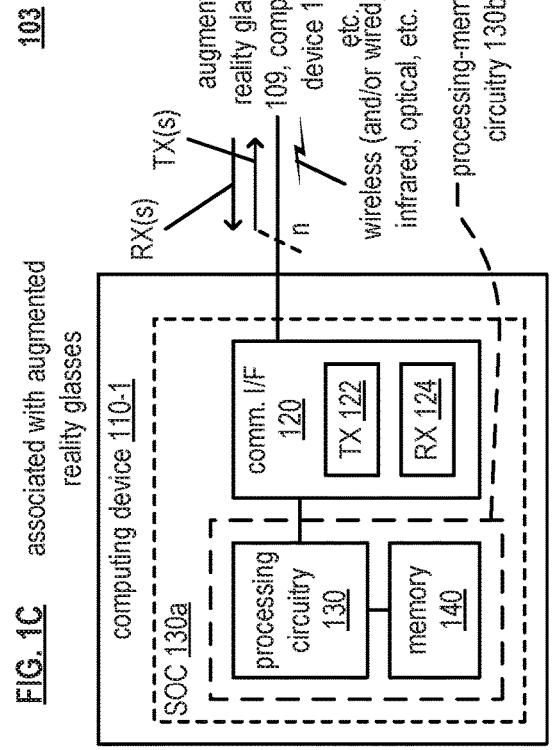
FIG. 1A
FIG. 1B
FIG. 1C
FIG. 1D

CONTEXTUAL ADJUSTMENT TO AUGMENTED REALITY GLASSES

BACKGROUND

This invention relates to contextual adjustment of media output via augmented reality glasses, and more specifically, to contextual adjustment based on rendering of the media during output via a reality display of the augmented reality glasses.

Prior art augmented reality glasses are intended to be worn for long periods of time and to combine the projection of visible electronic content (e.g., text and images) while also providing a view of the real world. However, prior art augmented reality glasses have many limitations and do not truly merge the combination of what is projected via the display with the real world that is also viewed through the prior art prior art augmented reality glasses.

The prior art does not provide adequate solutions by which such combination pf projection and real world situation may be effectively integrated with one another to enhance the overall user experience. There exists much room for improvement in the operation of prior art augmented reality glasses.

BRIEF DESCRIPTION OF THE DRAWINGS

FIG. 1A is a diagram illustrating an embodiment of augmented reality glasses configured to interact with a user and a computing device according to various embodiments of the present invention;

FIG. 1B is a diagram illustrating an embodiment of one or more communication systems according to various embodiments of the present invention;

FIG. 1C is a diagram illustrating an embodiment of a computing device configured to operate within one or more communication systems according to various embodiments of the present invention;

FIG. 1D is a diagram illustrating an embodiment of a wireless communication system according to various embodiments of the present invention;

DETAILED DESCRIPTION

Figure 2:
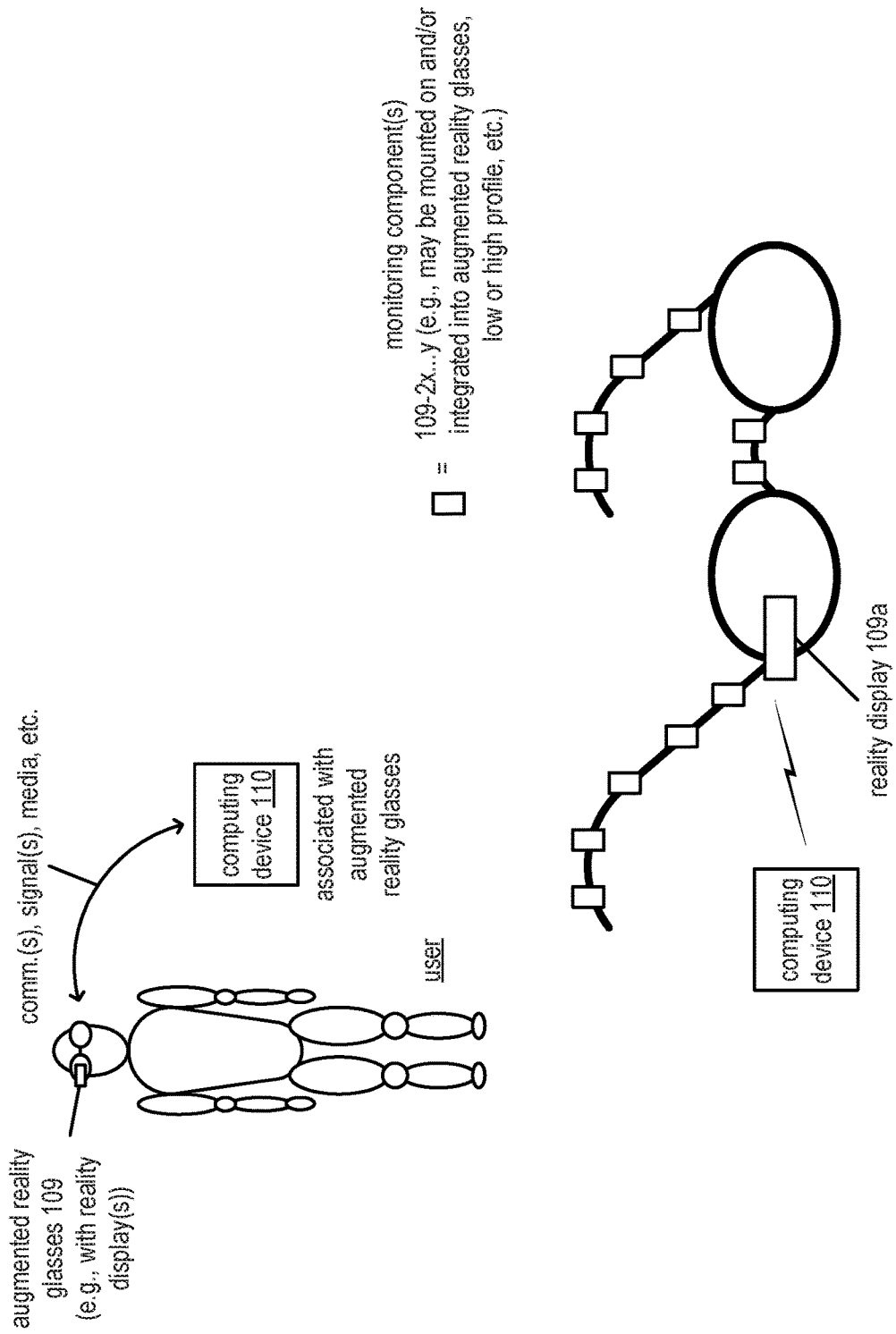
FIG. 2 is a diagram illustrating another embodiment of augmented reality glasses configured to interact with a user and a computing device according to various embodiments of the present invention.

According to an embodiment of the present invention, contextual adjustment of media output via augmented reality glasses is provided including contextual adjustment based on rendering of the media during output via a reality display of the augmented reality glasses. Augmented reality glasses implemented in accordance with various aspects, embodiments, and/or examples of the invention (and/or their equivalents) are configured to adapt to wearing styles that a user of may employ. For example, somebody wearing regular glasses might wear the augmented reality glasses in a variety of different ways. Some examples may include where the user presses their glasses closer to their face when trying to focus in on something hard to see. Another example may include where a user lowers their glasses on their nose. In this way, the user can look straight ahead to see an item ahead of them without the uses of lenses, and look down to read a book through the corrective lenses. Among other things, this disclosure describes solutions to perform contextual adjustment of what is shown in the displayable area of augmented reality glasses based upon how a user is wearing those glasses on their face.

FIG. 1A is a diagram illustrating an embodiment 101 of augmented reality glasses configured to interacted with a user and a computing device. Augmented reality glasses 109 (that include one or more reality displays) is configured to interact with and to support communications with one or more computing devices (e.g., computing device 110). Communications between the respective communication devices in this diagram and also in other embodiments, examples, diagrams, etc. herein may include any one or more of communications, signals, media, and/or other types of communications.

In an example of operation and implementation, the computing device 110 includes an interface configured to interface and communicate with augmented reality glasses associated with a user. Note that the augmented reality glasses include a reality display and also include one or more monitoring components configured to provide information that is related to at least one of position or movement of the augmented reality glasses with respect to the user. The computing device 110 is configured to receive the information that is related to the at least one of the position or the movement of the augmented reality glasses with respect to the user from the one or more monitoring components of the augmented reality glasses. The computing device 110 is also configured to process the information that is related to the at least one of the position or the movement of the augmented reality glasses with respect to the user to determine the at least one of the position or the movement of the augmented reality glasses with respect to the user. The computing device 110 is also configured to transmit media to the reality display of the augmented reality glasses to be consumed by the user. The computing device 110 is also configured to modify at least a portion of the media that is transmitted to the reality display of the augmented reality glasses based on the at least one of the position or the movement of the augmented reality glasses with respect to the user to facilitate contextual adjustment of rendering of the media during output via the reality display.

FIG. 1B is a diagram illustrating an embodiment 102 of one or more communication systems according to various embodiments of the present invention. One or more network segments 116 provide communication inter-connectivity for at least two computing devices 110 and 112 (e.g., such computing devices may be implemented and operative to support communications with other computing devices in certain examples, and such computing devices may alternatively be referred to as communication devices in such situations including both computing device and communication device functionality and capability). Generally speaking, any desired number of communication devices are included within one or more communication systems (e.g., as shown by communication device 114).

The various communication links within one or more network segments 116 may be implemented using any of a variety of communication media including communication links implemented as wireless, wired, optical, satellite, microwave, and/or any combination thereof, etc. communication links. In general, the one or more network segments 116 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Also, in some instances, communication links of different types may cooperatively form a connection pathway between any two communication devices. Considering one possible example, a communication pathway between devices 110 and 112 may include some segments of wired communication links and other segments of optical communication links. Note also that the computing devices 110-114 may be of a variety of types of devices including stationary devices, mobile devices, portable devices, etc. and may support communications for any of a number of services or service flows including data, telephony, television, Internet, media, synchronization, etc.

In an example of operation and implementation, computing device 110 includes a communication interface to support communications with one or more of the other devices 112-114. In an example, the computing device 110 includes a communication interface configured to interface and communicate with a communication network (e.g., the one or more network segments 116), memory that stores operational instructions, and processing circuitry coupled to the communication interface and to the memory. The processing circuitry is configured to execute the operational instructions to perform various functions, operations, etc. Note that the communication supported by the computing device 110 may be bidirectional/to and from the one or more of the other computing devices 112-114 or unidirectional (or primarily unidirectional) from the one or more of the other computing devices 112-114.

In one example, computing device 110 includes a processing circuitry that generates, modulates, encodes, etc. and transmits signals via a communication interface of the computing device 110 and also receives and processes, demodulates, decodes, etc. other signals received via the communication interface of the computing device 110 (e.g., received from other computing devices such as computing device 112, computing device 114, etc.).

Note also that the communication interface 120 may include functionality to support receipt of user input and output of user output (e.g., via a touchscreen, a keyboard, audio and/or video input/output ports, etc.) to facilitate interaction with one or more users of the computing device 110. Such functionality is implemented separately from the communication interface 120 in some examples and is integrated into the communication interface 120 in other examples.

In an example of operation and implementation, computing device 110 is associated with augmented reality glasses and is configured to support communications, (e.g., via at least one interface of the computing device 110) with a communication system to support transmission of the media to the reality display of the augmented reality glasses to be consumed by the user. Note that the communication system may include any one or more of, or any comb of, a satellite communication system, a wireless communication system, a wired communication system, a fiber-optic communication system, and/or a mobile communication system. Note that media may be retrieved by, received by, etc. the computing device 110 to be used in accordance with operations performed in conjunction with augmented reality glasses. Also, note that media may be also be retrieved from, received from, etc. memory of the computing device 110 to be used in accordance with operations performed in conjunction with augmented reality glasses.

FIG. 1C is a diagram illustrating an embodiment 103 of a computing device configured to operate within one or more communication systems according to various embodiments of the present invention. The computing device 110-1 includes a communication interface 120 and processing circuitry 130. The communication interface 120 includes functionality of a transmitter 122 and a receiver 124 to support communications with one or more other devices within a communication system. The computing device 110-1 may also include memory 140 to store information including one or more signals generated by the computing device 110-1 or such information received from other devices (e.g., computing device 112) via one or more communication channels. For example, memory 140 may also include and store various operational instructions for use by the processing circuitry 130 in regards to the processing of messages and/or other received signals and generation of other messages and/or other signals including those described herein (e.g., image and/or video signals). Memory 140 may also store information including one or more types of encoding, one or more types of symbol mapping, concatenation of various modulation coding schemes, etc. as may be generated by the computing device 110-1 or such information received from other devices via one or more communication channels. The communication interface 120 supports communications to and from one or more other devices (e.g., computing device 112-1 and/or other computing devices). Memory 140 may also store information including one or more types of video and/or image processing in accordance with the various aspects, embodiments, and/or examples, and their equivalents, described herein.

Operation of the communication interface 120 may be directed by the processing circuitry 130 such that processing circuitry 130 transmits and receives signals (TX(s) and RX(s)) via the communication interface 120. Generally speaking, computing device 110-1 is able to support communications with one or more other computing device within one or more communication systems including computing device 112-2.

A computing device 110-1 (e.g., which may be any one of computing devices 110, 112, or 114 as with reference to FIG. 1B) is in communication with another computing device 112-1 (and/or any number of other wireless computing devices) via a communication medium. The computing device 110-1 includes a communication interface 120 to perform transmitting and receiving of at least one signal, symbol, packet, and/or frame, etc. (e.g., using a transmitter 122 and a receiver 124) (note that general reference to packet or frame may be used interchangeably).

Generally speaking, the communication interface 120 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the computing device 110-1 operates), equalization, pre-equalization, metric generation, symbol mapping and/or de-mapping, automatic gain control (AGC) operations, and/or any other operations that may be performed by an AFE and/or PHY component within a computing device.

In some implementations, the computing device 110-1 also includes a processing circuitry 130, and an associated memory 140, to execute various operations including interpreting at least one signal, symbol, packet, and/or frame transmitted to computing device 112-1 and/or received from the computing device 112-1 and/or any other computing device. The computing devices 110-1 and 112-1 may be implemented using at least one integrated circuit in accordance with any desired configuration or combination of components, modules, etc. within at least one integrated circuit. Also, the computing devices 110 and/or 112 may each include one or more antennas for transmitting and/or receiving of at least one packet or frame wirelessly (e.g., computing device 110-1 may include m antennas, and computing device 112-1 may include n antennas, where m and n are positive integers).

Also, in some examples, note that one or more of the processing circuitry 130, the communication interface 120 (including the TX 122 and/or RX 124 thereof), and/or the memory 140 may be implemented in one or more "processing modules," "processing circuits," "processors," and/or "processing units" or their equivalents. Considering one example, a system-on-a-chip (SOC) 130a may be implemented to include the processing circuitry 130, the communication interface 120 (including the TX 122 and/or RX 124 thereof), and the memory 140 (e.g., SOC 130a being a multi-functional, multi-module integrated circuit that includes multiple components therein). Considering another example, processing-memory circuitry 130b may be implemented to include functionality similar to both the processing circuitry 130 and the memory 140 yet the communication interface 120 is a separate circuitry (e.g., processing-memory circuitry 130b is a single integrated circuit that performs functionality of a processing circuitry and a memory and is coupled to and also interacts with the communication interface 120).

Considering even another example, two or more processing circuitries may be implemented to include the processing circuitry 130, the communication interface 120 (including the TX 122 and/or RX 124 thereof), and the memory 140. In such examples, such a "processing circuitry," "processing circuitry," or "processing circuitries" (or "processor" or "processors") is/are configured to perform various operations, functions, communications, etc. as described herein. In general, the various elements, components, etc. shown within the computing device 110-1 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the computing device 110-1 includes both processing circuitry 130 and communication interface 120 configured to perform various operations. In other examples, the computing device 110-1 includes SOC 130a configured to perform various operations. In even other examples, the computing device 110-1 includes processing-memory circuitry 130b configured to perform various operations. Generally, such operations include generating, transmitting, etc. signals intended for one or more other computing device (e.g., computing device 112-1) and receiving, processing, etc. other signals received for one or more other devices (e.g., computing device 112-1).

In some examples, note that the communication interface 120, which is coupled to the processing circuitry 130, is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the computing device 110-1 may be communicated via any of these types of communication systems.

Note that computing device 110-1 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system, among other types of communication systems.

In an example of operation and implementation, a computing device includes a communication interface 120 configured to interface and communicate with a communication network, memory 140 that stores operational instructions, and processing circuitry 130 coupled to the communication interface and to the memory. Also, the computing device 110 includes an interface (e.g., interface 120 and/or another interface) configured to interface and communicate with augmented reality glasses associated with a user. Note that the augmented reality glasses include a reality display and also include one or more monitoring components configured to provide information that is related to at least one of position or movement of the augmented reality glasses with respect to the user.

The processing circuitry 130 is configured to execute the operational instructions to perform various functions, operations, and processes (sometimes in cooperation with the communication interface 120 and/or the memory 140). In an example of operation and implementation, the processing circuitry 130 is configured to receive the information that is related to the at least one of the position or the movement of the augmented reality glasses with respect to the user from the one or more monitoring components of the augmented reality glasses. The processing circuitry 130 is also configured to process the information that is related to the at least one of the position or the movement of the augmented reality glasses with respect to the user to determine the at least one of the position or the movement of the augmented reality glasses with respect to the user. The processing circuitry 130 is also configured to transmit media to the reality display of the augmented reality glasses to be consumed by the user. The processing circuitry 130 is also configured to modify at least a portion of the media that is transmitted to the reality display of the augmented reality glasses based on the at least one of the position or the movement of the augmented reality glasses with respect to the user to facilitate contextual adjustment of rendering of the media during output via the reality display.

In some examples, note that the one or more monitoring components of the augmented reality glasses include one or more of a first at least one sensor mounted on a nosepad of the augmented reality glasses, a second at least one sensor mounted on at least one temple tips of the augmented reality glasses, a third at least one sensor mounted on the augmented reality glasses, a capacitive sensor mounted on the augmented reality glasses and that is configured to detect human touch via capacitively coupling, an ambient light sensor mounted on the augmented reality glasses that is configured to detect a level of ambient light brightness, and/or at least one of an accelerometer or a gyroscope mounted on the augmented reality glasses that is configured to detect orientation of the augmented reality glasses with respect to the user or the at least one of the position or the movement of the augmented reality glasses with respect to the user.

Also, in some other examples, note that the position of the augmented reality glasses with respect to the user corresponds to one or more of a degree of pressure of the augmented reality glasses to the user, closeness of the augmented reality glasses to the user, placement of the augmented reality glasses on the user, placement of contact of the augmented reality glasses on a nose of the user, an orientation of the reality display of the augmented reality glasses to the user, and/or an angle of the reality display of the augmented reality glasses to the user.

In addition, in some other examples, modification of the at least the portion of the media that is transmitted to the reality display of the augmented reality glasses based on the at least one of the position or the movement of the augmented reality glasses with respect to the user includes one or more of modification of a resolution of the media, modification of a frame size of the media, modification of a font size of text included in the media, modification of a location of the text included in the media, modification of an orientation of the media with respect to the reality display of the augmented reality glasses, inclusion of textual information regarding the media, and/or replacement of the at least the portion of the media or at least one other portion of the media with the textual information regarding the media.

Also, in some examples, the processing circuitry 130 is further configured to execute the operational instructions to determine a pattern of user behavior based on the information that is related to the at least one of the position or the movement of the augmented reality glasses with respect to the user during transmission of the media to the reality display of the augmented reality glasses to be consumed by the user. Also, the processing circuitry 130 is further configured to execute the operational instructions to modify other media that is transmitted to the reality display of the augmented reality glasses based on content of the other media and the pattern of user behavior.

In addition, in some examples, the processing circuitry 130 is further configured to execute the operational instructions to determine a pattern of user behavior based on the information that is related to the at least one of the position or the movement of the augmented reality glasses with respect to the user during transmission of the media to the reality display of the augmented reality glasses to be consumed by the user. The processing circuitry 130 is also configured to determine an anticipated change of the at least one of the position or the movement of the augmented reality glasses with respect to the user based on content of other media and the pattern of user behavior. Also, the processing circuitry 130 is also configured to modify the other media that is transmitted to the reality display of the augmented reality glasses based on the anticipated change of the at least one of the position or the movement of the augmented reality glasses with respect to the user.

Moreover, also, in some examples, note that the augmented reality glasses further include a user interface configured to enable or disable modification of the at least the portion of the media that is transmitted to the reality display of the augmented reality glasses. For example, the augmented reality glasses include an off/off switch or a bypass switch that allows a user to enable or disable modification of the at least the portion of the media that is transmitted to the reality display of the augmented reality glasses.

FIG. 1D is a diagram illustrating an embodiment 104 of a wireless communication system according to various embodiments of the present invention. The wireless communication system includes one or more base stations and/or access points 150, wireless communication devices 160-166 (e.g., wireless stations (STAs)), and a network hardware component 156. The wireless communication devices 160-166 may be laptop computers, or tablets, 160, personal digital assistants 162, personal computers 164 and/or cellular telephones 166 (and/or any other type of wireless communication device). Other examples of such wireless communication devices 160-166 could also or alternatively include other types of devices that include wireless communication capability (and/or other types of communication functionality such as wired communication functionality, satellite communication functionality, fiber-optic communication functionality, etc.). Examples of wireless communication devices may include a wireless smart phone, a cellular phone, a laptop, a personal digital assistant, a tablet, a personal computers (PC), a work station, and/or a video game device.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The one or more base stations (BSs) or access points (APs) 150 are operably coupled to the network hardware 156 via local area network connection 152. The network hardware 156, which may be a router, switch, bridge, modem, system controller, etc., provides a wide area network connection 154 for the communication system. Each of the one or more base stations or access points 150 has an associated antenna or antenna array to communicate with the wireless communication devices in its area. Typically, the wireless communication devices register with a particular base station or access point 150 to receive services from the communication system. For direct connections (i.e., point-to-point communications), wireless communication devices communicate directly via an allocated channel.

Any of the various wireless communication devices (WDEVs) 160-166 and one or more BSs or APs 150 may include a processing circuitry and/or a communication interface to support communications with any other of the wireless communication devices 160-166 and one or more BSs or APs 150. In an example of operation, a processing circuitry and/or a communication interface implemented within one of the devices (e.g., any one of the WDEVs 160-166 and one or more BSs or APs 150) is/are configured to process at least one signal received from and/or to generate at least one signal to be transmitted to another one of the devices (e.g., any other one of the one or more WDEVs 160-166 and one or more BSs or APs 150).

Note that general reference to a communication device, such as a wireless communication device (e.g., WDEVs) 160-166 and one or more BSs or APs 150 in FIG. 1D, or any other communication devices and/or wireless communication devices may alternatively be made generally herein using the term 'device' (e.g., "device" when referring to "wireless communication device" or "WDEV"). Generally, such general references or designations of devices may be used interchangeably.

The processing circuitry and/or the communication interface of any one of the various devices, WDEVs 160-166 and one or more BSs or APs 150, may be configured to support communications with any other of the various devices, WDEVs 160-166 and one or more BSs or APs 150. Such communications may be uni-directional or bi-directional between devices. Also, such communications may be uni-directional between devices at one time and bi-directional between those devices at another time.

In an example, a device (e.g., any one of the WDEVs 160-166 and one or more BSs or APs 150) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 160-166 and one or more BSs or APs 150) includes a processing circuitry to support communications with one or more of the other wireless communication devices (e.g., any other of the WDEVs 160-166 and one or more BSs or APs 150). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 160-166 and one or more BSs or APs 150) includes a processing circuitry, a communication interface, and a memory configured to support communications with one or more of the other wireless communication devices (e.g., any other of the WDEVs 160-166 and one or more BSs or APs 150).

In an example of operation and implementation, the WDEV 162 is associated with augmented reality glasses. The WDEV 162 includes an interface configured to interface and communicate with augmented reality glasses associated with a user. Note that the augmented reality glasses include a reality display and also include one or more monitoring components configured to provide information that is related to at least one of position or movement of the augmented reality glasses with respect to the user. The WDEV 162 is configured to receive the information that is related to the at least one of the position or the movement of the augmented reality glasses with respect to the user from the one or more monitoring components of the augmented reality glasses. The WDEV 162 is also configured to process the information that is related to the at least one of the position or the movement of the augmented reality glasses with respect to the user to determine the at least one of the position or the movement of the augmented reality glasses with respect to the user. The WDEV 162 is also configured to transmit media to the reality display of the augmented reality glasses to be consumed by the user. The WDEV 162 is also configured to modify at least a portion of the media that is transmitted to the reality display of the augmented reality glasses based on the at least one of the position or the movement of the augmented reality glasses with respect to the user to facilitate contextual adjustment of rendering of the media during output via the reality display.

FIG. 2 is a diagram illustrating another embodiment 200 of augmented reality glasses configured to interact with a user and a computing device according to various embodiments of the present invention. Augmented reality glasses implemented in accordance with various aspects, embodiments, and/or examples of the invention (and/or their equivalents) include an augmented reality display that is configured to project visible content onto the lens of augmented reality glasses. Also, the augmented reality glasses are implemented to include one or more monitoring components.

In some examples, note that the one or more monitoring components of the augmented reality glasses include one or more of a first at least one sensor mounted on a nosepad of the augmented reality glasses, a second at least one sensor mounted on at least one temple tips of the augmented reality glasses, a third at least one sensor mounted on the augmented reality glasses, a capacitive sensor mounted on the augmented reality glasses and that is configured to detect human touch via capacitively coupling, an ambient light sensor mounted on the augmented reality glasses that is configured to detect a level of ambient light brightness, and/or at least one of an accelerometer or a gyroscope mounted on the augmented reality glasses that is configured to detect orientation of the augmented reality glasses with respect to the user or the at least one of the position or the movement of the augmented reality glasses with respect to the user.

Some examples of monitoring components include nose pad touch sensors that are configured to detect contact with the wearer's nose and movement along the bridge of the nose. Other examples of monitoring components include temple tips touch sensors that are configured to detect contact around the wearer's ears and movement around the ears. Note that the computing device with which the augmented reality glasses are associated may be a mobile device that is configured to be paired with the augmented reality glasses and defines what is shown in the glasses.

Also, note that such touch sensors as may be implemented within such the augmented reality glasses, note that such touch sensors may be implemented using various technologies small enough to fit within the frame of augmented reality glasses.

For example, other examples of monitoring components include capacitive sensing components that are configured to detect human touch through capacitive coupling sensors. Capacitive sensing is being used to replace mechanical buttons. For example, within the Apple iPhone 7 and 8, physical home button is replaced with a capacitive sensor. These small sensors could be placed on the nose pad and temple tips of the augmented reality glasses to detect contact with human skin.

Other examples of monitoring components include an ambient light sensor that is configured to detect levels of brightness. These sensors may be embedded in smart phones to control screen brightness and also used to detect when a phone is being held to a user's ear for a phone call and used to turn off the screen. Ambient light sensors on the nose pad and temple tips could determine if the augmented reality glasses are in contact with the user's face.

Yet other examples of monitoring components include accelerometer and/or gyroscope that are configured to detect movement and orientation. For example, augmented reality glasses such as the those implemented by Magic Leap Lightwear (https://www.magicleap.com) embed such sensors to detect motion. Use of these sensors can detect when a user has moved their augmented reality glasses closer or further from their face, or lowered their glasses down their nose.

Figure 3:
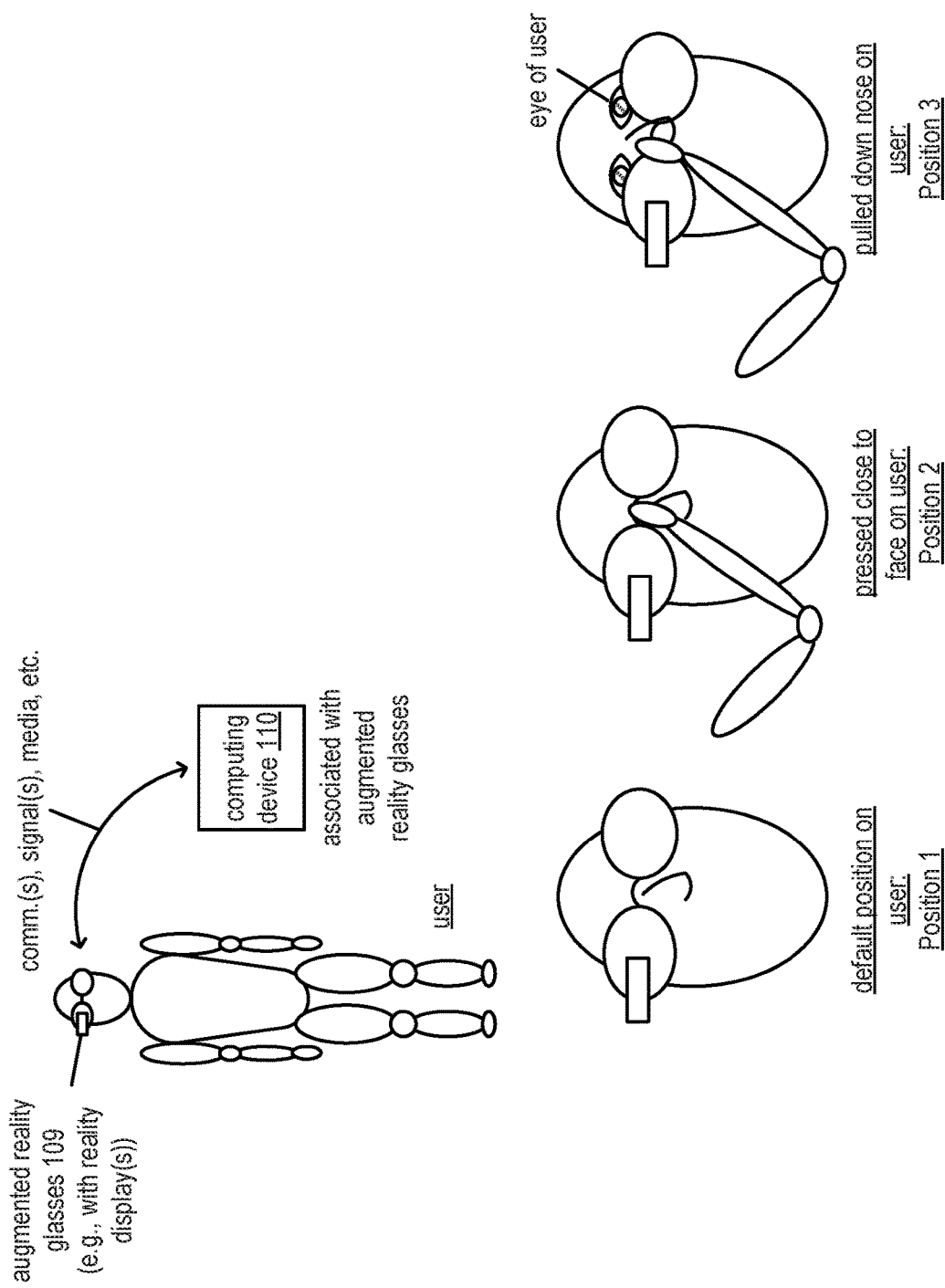
FIG. 3 is a diagram illustrating an embodiment of various positions by which a user may wear augmented reality glasses configured to interact with a computing device according to various embodiments of the present invention.

FIG. 3 is a diagram illustrating an embodiment 300 of various positions by which a user may wear augmented reality glasses configured to interact with a computing device according to various embodiments of the present invention. In some examples, the monitoring components of the augmented reality glasses include touch sensors installed on the nose pad and temple tips of the augmented reality glasses register contact with human skin. For example, such touch sensors are configured to detect degree of pressure (e.g., how closely a sensor is touching skin), placement of contact (e.g., where on the touch sensor contact with skin occurs), and/or angle of sensor (e.g., measures the angle in which the sensor is facing). The touch sensor data from the temple tips or nose pad is sent to a processing unit on the augmented reality glasses or on a paired mobile device for processing.

The degree, placement, and/or angle data is used to derive how the augmented reality glasses are being worn on a user's face. Over time the system learns the default position that a user typically wears their augmented reality glasses (e.g., Position 1 in FIG. 3). Position 2 corresponds to a user pressing the augmented reality glasses closer to the face, and Position 3 corresponds to a user moving the glasses near the end of the nose of the user.

The system uses the sensor data from the touch sensors to detect when the augmented reality glasses move from the default position. When a change in sensor data is detected the system combines degree of pressure, placement of contact, and angle of sensor from each of the sensors to derive the position the augmented reality glasses are being worn on a wearer's face (e.g., as with respect to FIG. 3). While the figure shows three positions, the system could detect any number of distinct and different positional changes.

Figure 4:
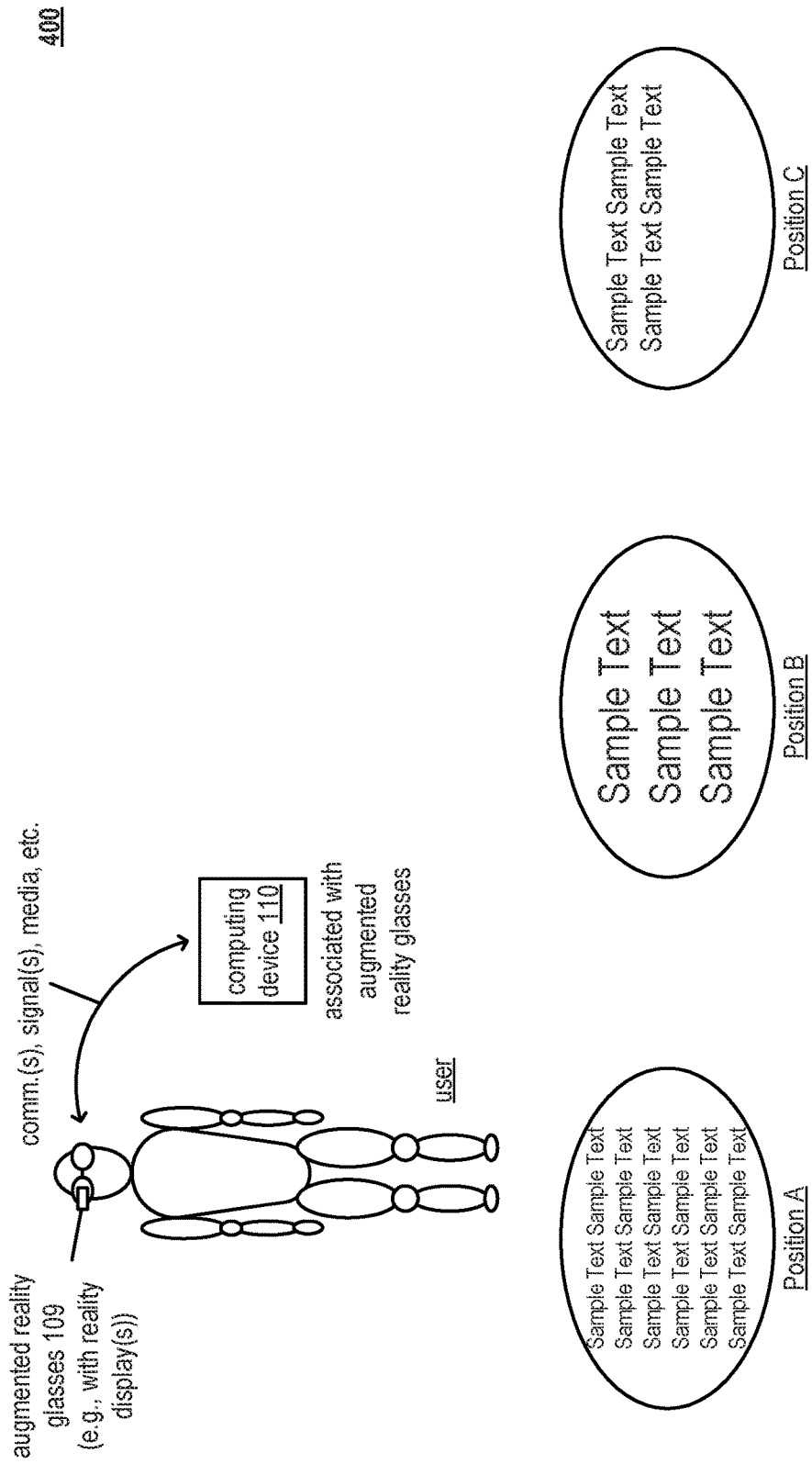
FIG. 4 is a diagram illustrating an embodiment of derived positions of augmented reality glasses configured to interact with a computing device according to various embodiments of the present invention.

FIG. 4 is a diagram illustrating an embodiment 400 of derived positions of augmented reality glasses configured to interact with a computing device according to various embodiments of the present invention. In addition, note that a detected change in how augmented reality glasses are worn affects what is shown in the augmented reality glasses. This effectively provides the user with a gesture to modify how augmented reality glasses operate based on how they are worn. For example, when a change is detected, the system derives the context in which the augmented reality glasses are being used and adjusts the augmented reality display accordingly. Contextual adjustments can be configured by the user based on their preferences. For example, such operations may be based on text-based content. When a user is reading text projected in their augmented reality glasses, the size and position can be adjusted based on how the glasses are being worn (e.g., as with respect to FIG. 4):

Position A—Text fills the displayable area
Position B—Text size increased
Position C—Text displayed only in the top portion of the display area (text in the bottom portion of the display area would not be visible based on how the user is wearing the glasses)

Figure 5:
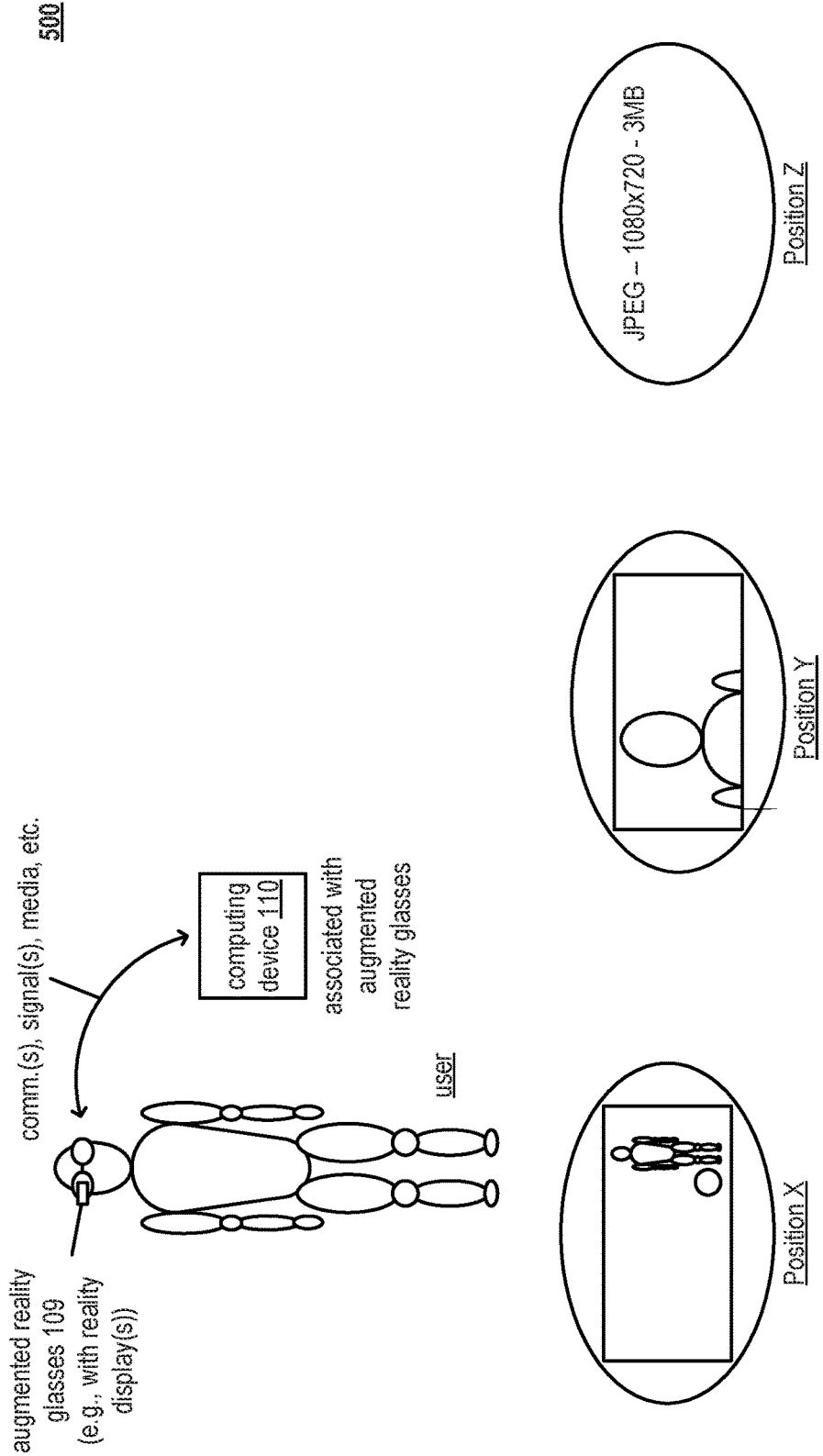
FIG. 5 is a diagram illustrating an embodiment of contextual adjustment for text size by augmented reality glasses configured to interact with a computing device according to various embodiments of the present invention.

FIG. 5 is a diagram illustrating an embodiment 500 of contextual adjustment for text size by augmented reality glasses configured to interact with a computing device according to various embodiments of the present invention. In addition, note that a detected change in how augmented reality glasses are worn affects what is shown in the augmented reality glasses. For example, with respect to viewing a photograph. For example, a user viewing a photograph can adjust how the photograph is displayed in the display area of the augmented reality glasses (e.g., as with respect to FIG. 4):

Position X—Full photograph shown
Position Y—Photograph zoomed in to reveal a particular detail (for example a user can configure to always zoom in on faces)
Position Z—Show information about a photograph (full photograph would not be visible is the display area based on how the user is wearing the glasses).

Note that the present disclosure present various solutions for a method and system that is operative to improve the operation of augmented reality glasses. Touch sensors mounted on the nose pads and temple tips of augmented reality glasses capture the degree of pressure, placement of contact, and angle of sensor as these glasses are worn by a user. Touch sensors detect when the position changes of how augmented reality glasses are being worn. Touch sensor data is used to derive the new position in which the glasses are being worn. Also, the augmented reality display area is adjusted based upon the context of how the user is using the augmented reality glasses and how the glasses are being worn. For example, pressing the glasses closer to a user's face increases text size or zooms in on a picture being displayed. Lowering the glasses on the edge of a user's nose reduces the displayable area size to only the top half of the lens, or changes from viewing a picture to viewing metadata about a picture.

Note that various aspects, embodiments, and/or examples of the invention (and/or their equivalents) provide for a system that utilizes touch sensors on the nose pads and temple tips of augmented reality glasses to derive the position the glasses are being worn on a user's face. Also, note that various aspects, embodiments, and/or examples of the invention (and/or their equivalents) provide for a system that contextually adjusts what is shown in the display area of augmented reality glasses based upon the application being run and the position in which the augmented reality glasses are worn on a user's face.

Figure 6:
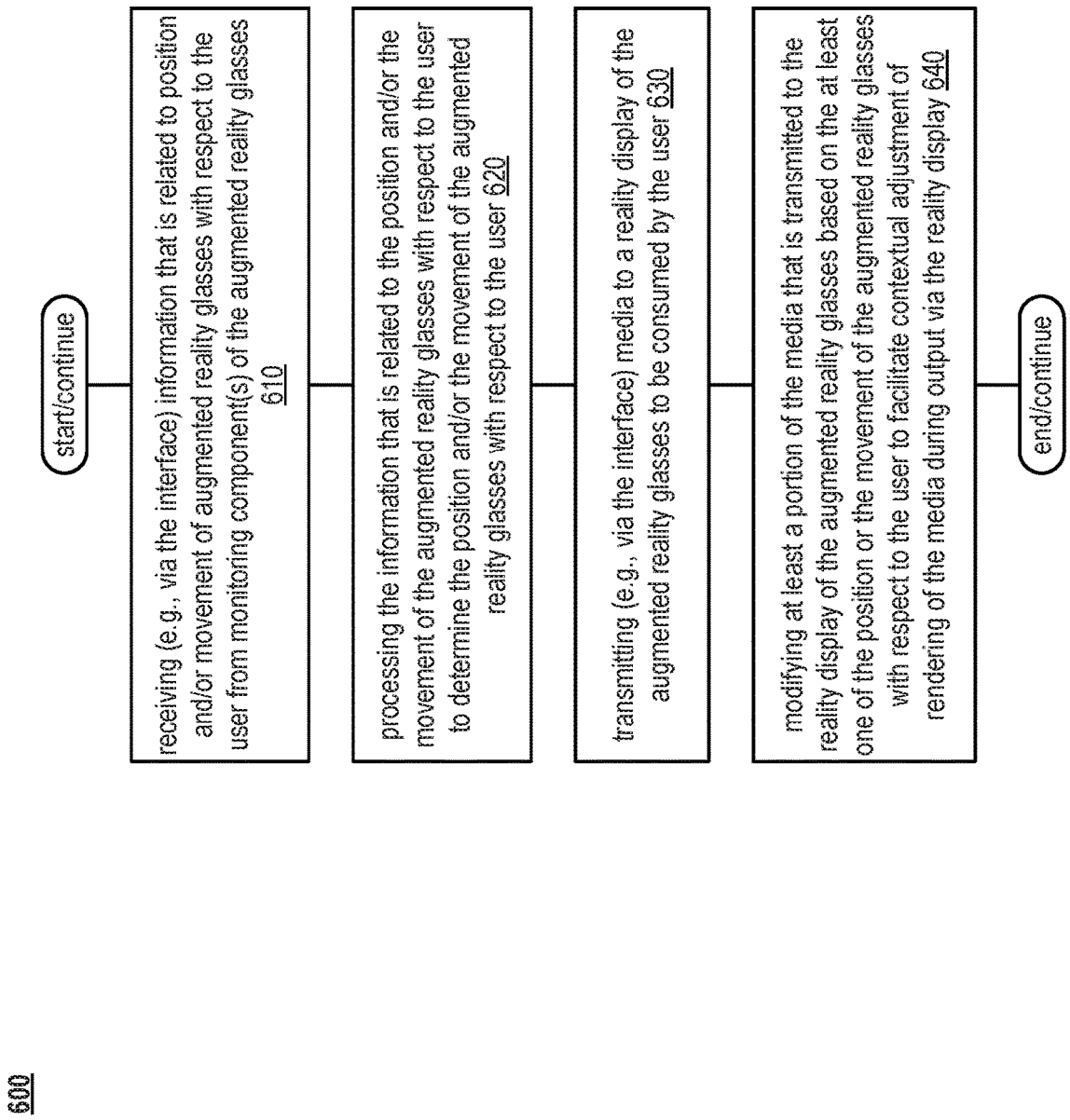
FIG. 6 is a diagram illustrating an embodiment of a method for execution by one or more computing devices according to various embodiments of the present invention.

FIG. 6 is a diagram illustrating an embodiment of a method 600 for execution by one or more computing devices according to various embodiments of the present invention.

The method 600 operates in step 610 by receiving (e.g., via an interface of the computing device that is configured to interface and communicate with augmented reality glasses associated with a user) information that is related to at least one of position or movement of augmented reality glasses with respect to the user from one or more monitoring components of the augmented reality glasses.

The method 600 then continues in step 620 by processing the information that is related to the at least one of the position or the movement of the augmented reality glasses with respect to the user to determine the at least one of the position or the movement of the augmented reality glasses with respect to the user.

The method 600 also operates in step 630 by transmitting (e.g., via the interface) media to a reality display of the augmented reality glasses to be consumed by the user.

The method 600 continues in step 640 by modifying at least a portion of the media that is transmitted to the reality display of the augmented reality glasses based on the at least one of the position or the movement of the augmented reality glasses with respect to the user to facilitate contextual adjustment of rendering of the media during output via the reality display.

In some examples and/or variants of the method 600, the one or more monitoring components of the augmented reality glasses includes one or more of a first at least one sensor mounted on a nosepad of the augmented reality glasses, a second at least one sensor mounted on at least one temple tips of the augmented reality glasses, a third at least one sensor mounted on the augmented reality glasses, a capacitive sensor mounted on the augmented reality glasses and that is configured to detect human touch via capacitively coupling, an ambient light sensor mounted on the augmented reality glasses that is configured to detect a level of ambient light brightness, and/or at least one of an accelerometer or a gyroscope mounted on the augmented reality glasses that is configured to detect orientation of the augmented reality glasses with respect to the user or the at least one of the position or the movement of the augmented reality glasses with respect to the user.

In other examples and/or variants of the method 600, the position of the augmented reality glasses with respect to the user corresponds to one or more of a degree of pressure of the augmented reality glasses to the user, closeness of the augmented reality glasses to the user, placement of the augmented reality glasses on the user, placement of contact of the augmented reality glasses on a nose of the user, an orientation of the reality display of the augmented reality glasses to the user, and/or an angle of the reality display of the augmented reality glasses to the user.

In yet other examples and/or variants of the method 600, modification of the at least the portion of the media that is transmitted to the reality display of the augmented reality glasses based on the at least one of the position or the movement of the augmented reality glasses with respect to the user includes one or more of modification of a resolution of the media, modification of a frame size of the media, modification of a font size of text included in the media, modification of a location of the text included in the media, modification of an orientation of the media with respect to the reality display of the augmented reality glasses, inclusion of textual information regarding the media, and/or replacement of the at least the portion of the media or at least one other portion of the media with the textual information regarding the media.

Yet other examples and/or variants of the method 600 operate by determining a pattern of user behavior based on the information that is related to the at least one of the position or the movement of the augmented reality glasses with respect to the user during transmission of the media to the reality display of the augmented reality glasses to be consumed by the user. Such other examples and/or variants of the method 600 also operate by modifying other media that is transmitted to the reality display of the augmented reality glasses based on content of the other media and the pattern of user behavior.

Yet further examples and/or variants of the method 600 operate by determining a pattern of user behavior based on the information that is related to the at least one of the position or the movement of the augmented reality glasses with respect to the user during transmission of the media to the reality display of the augmented reality glasses to be consumed by the user. Such further examples and/or variants of the method 600 operate by determining an anticipated change of the at least one of the position or the movement of the augmented reality glasses with respect to the user based on content of other media and the pattern of user behavior. Such further examples and/or variants of the method 600 also operate by modifying the other media that is transmitted to the reality display of the augmented reality glasses based on the anticipated change of the at least one of the position or the movement of the augmented reality glasses with respect to the user.

Figure 7:
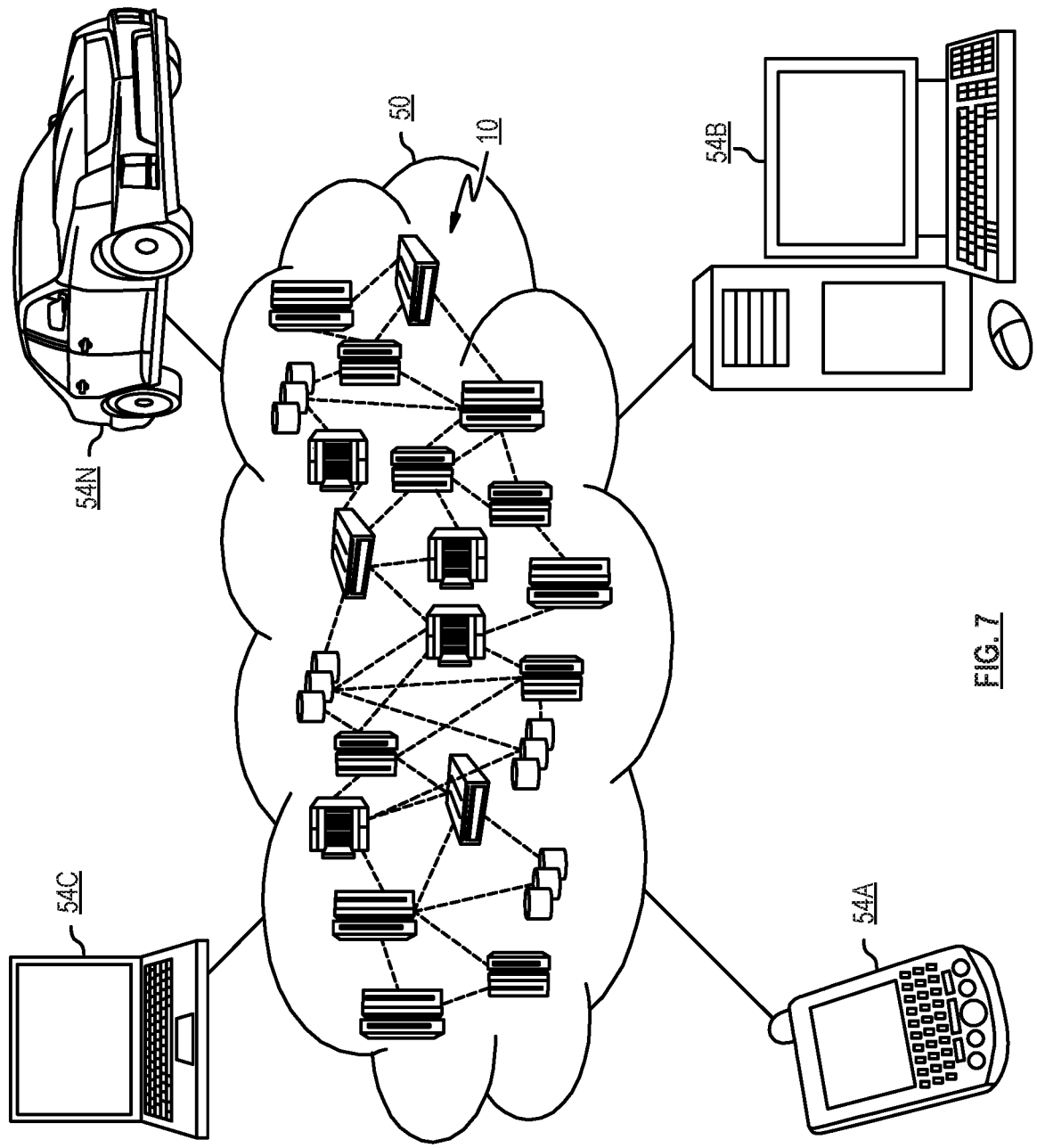
FIG. 7 depicts a cloud computing environment according to various embodiments of the present invention.

FIG. 7 depicts a cloud computing environment 700 according to various embodiments of the present invention. FIG. 7 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
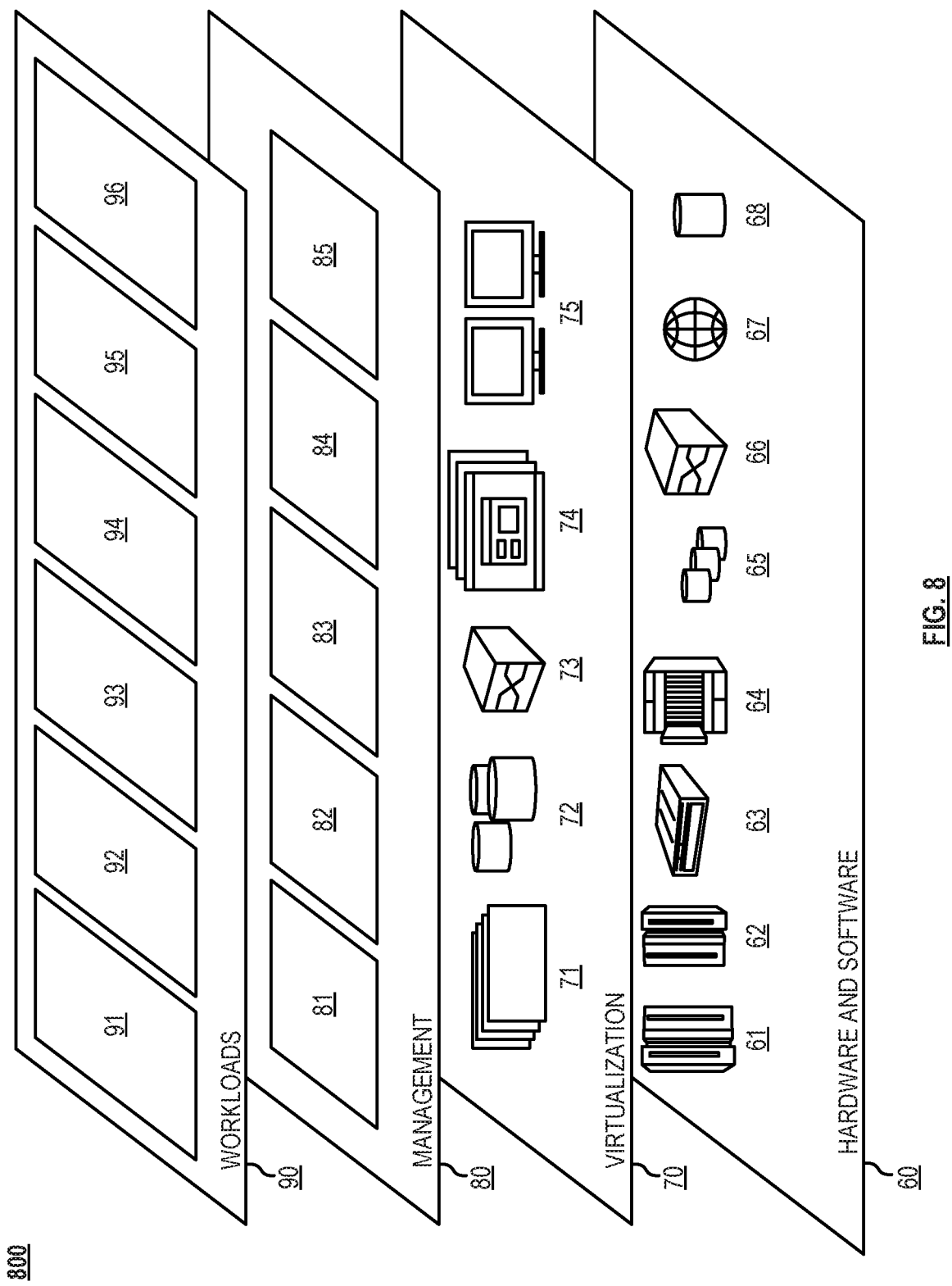
FIG. 8 depicts abstraction model layers according to various embodiments of the present invention.

FIG. 8 depicts abstraction model layers 800 according to various embodiments of the present invention. Referring now to FIG. 6, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 901 of FIG. 9.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual adjustment of rendering of the media during output via a reality display of augmented reality glasses, processing, and operations 96.

Figure 9:
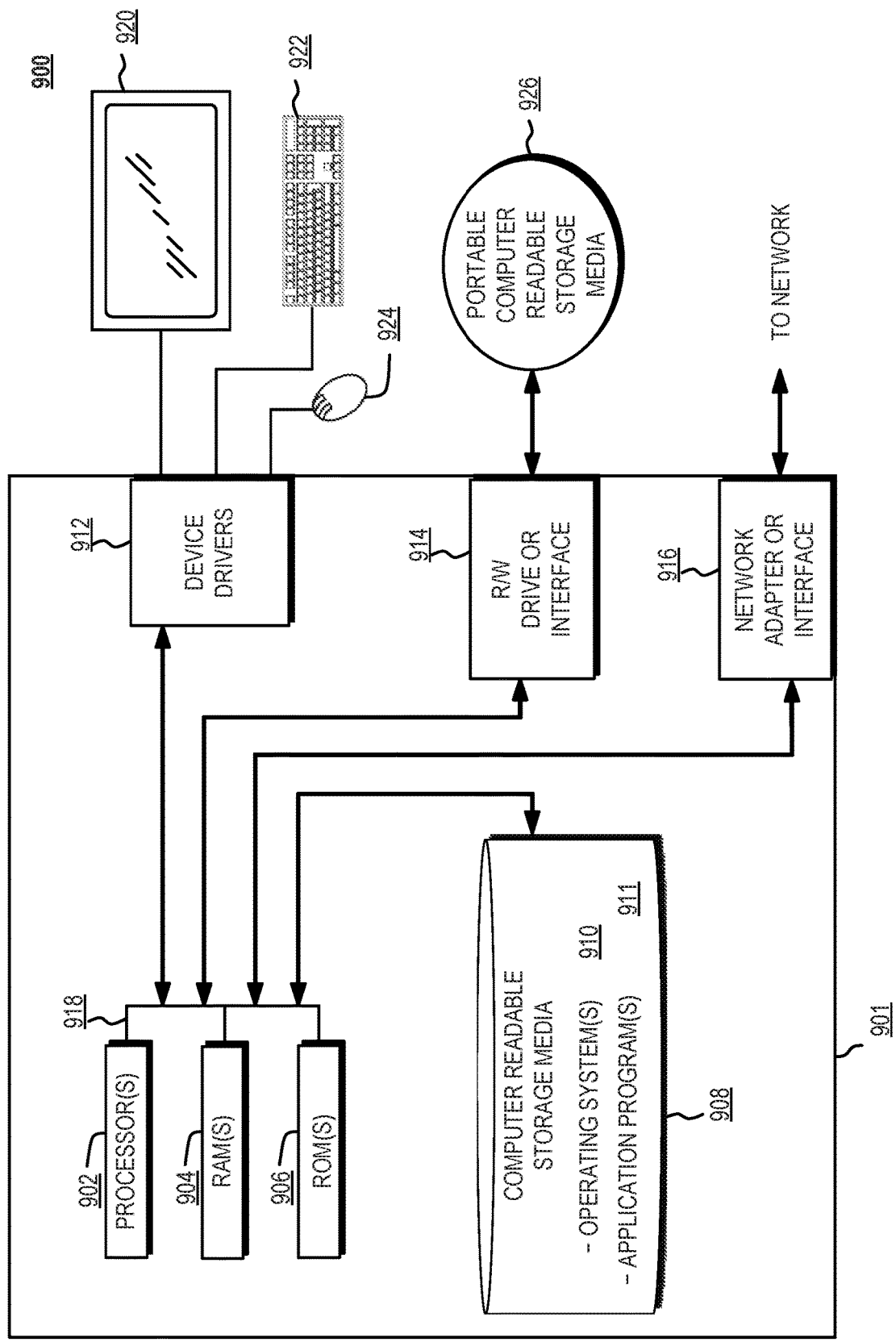
FIG. 9 depicts a block diagram of a computing device according to various embodiments of the present invention.

FIG. 9 depicts a block diagram 900 of a computing device according to various embodiments of the present invention. FIG. 9 depicts a block diagram of components of a computing device 901, which can be utilized to implement some or all of the cloud computing nodes 10, some or all of the computing devices 54A-N of FIG. 7, and/or to implement other computing devices described herein in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Computing device 901 can include one or more processors 902, one or more computer-readable RAMs 904, one or more computer-readable ROMs 906, one or more computer readable storage media 908, device drivers 912, read/write drive or interface 914, and network adapter or interface 916, all interconnected over a communications fabric 918. Communications fabric 918 can be implemented with any architecture designed for passing data and/or control information between processors (such as microprocessors, communications and network processors, etc.), system memory, peripheral devices, and any other hardware components within the system.

One or more operating systems 910 and/or application programs 911, such as network application server software 67 and database software 68 of FIG. 8, are stored on one or more of the computer readable storage media 908 for execution by one or more of the processors 902 via one or more of the respective RAMs 904 (which typically include cache memory). In the illustrated embodiment, each of the computer readable storage media 908 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 901 can also include a R/W drive or interface 914 to read from and write to one or more portable computer readable storage media 926. Application programs 911 on computing devices 901 can be stored on one or more of the portable computer readable storage media 926, read via the respective R/W drive or interface 914 and loaded into the respective computer readable storage media 908.

Computing device 901 can also include a network adapter or interface 916, such as a TCP/IP adapter card or wireless communication adapter. Application programs 911 on computing devices 54A-N can be downloaded to the computing device from an external computer or external storage device via a network (for example, the Internet, a local area network or other wide area networks or wireless networks) and network adapter or interface 916. From the network adapter or interface 916, the programs may be loaded into the computer readable storage media 908. The network may comprise copper wires, optical fibers, wireless transmission, routers, firewalls, switches, gateway computers and edge servers.

Computing device 901 can also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914, and network adapter or interface 916 can comprise hardware and software stored in computer readable storage media 908 and/or ROM 906.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, nonvolatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with augmented reality glasses associated with a user, wherein the augmented reality glasses include a reality display and also include a monitoring component configured to provide information that is related to a position of the augmented reality glasses with respect to the user;
memory that stores operational instructions; and
processing circuitry operably coupled to the interface and to the memory, wherein the processing circuitry is configured to execute the operational instructions to:
receive the information that is related to the position of the augmented reality glasses with respect to the user from the monitoring component of the augmented reality glasses;
process the information that is related to the position of the augmented reality glasses with respect to the user to determine the position of the augmented reality glasses with respect to the user;
transmit media to the reality display of the augmented reality glasses to be consumed by the user;
modify at least a portion of the media that is transmitted to the reality display of the augmented reality glasses based on the position of the augmented reality glasses with respect to the user to facilitate contextual adjustment of rendering of the media during output via the reality display;
determine a pattern of user behavior based on the information that is related to the position of the augmented reality glasses with respect to the user during transmission of the media to the reality display of the augmented reality glasses to be consumed by the user;
determine an anticipated change of the position of the augmented reality glasses with respect to the user based on content of other media and the pattern of user behavior; and
modify the other media that is transmitted to the reality display of the augmented reality glasses based on the anticipated change of the position of the augmented reality glasses with respect to the user.

2. The computing device of claim 1, wherein the monitoring component of the augmented reality glasses is selected from the group consisting of:
a first at least one sensor mounted on a nosepad of the augmented reality glasses;
a second at least one sensor mounted on at least one temple tips of the augmented reality glasses;
a third at least one sensor mounted on the augmented reality glasses;
a capacitive sensor mounted on the augmented reality glasses and that is configured to detect human touch via capacitively coupling;
an ambient light sensor mounted on the augmented reality glasses that is configured to detect a level of ambient light brightness; and
at least one of an accelerometer or a gyroscope mounted on the augmented reality glasses that is configured to detect orientation of the augmented reality glasses with respect to the user or the at least one of the position or the movement of the augmented reality glasses with respect to the user.

3. The computing device of claim 1, wherein the position of the augmented reality glasses with respect to the user corresponds to an attribute selected from the group consisting of:
a degree of pressure of the augmented reality glasses to the user;
closeness of the augmented reality glasses to the user;
placement of the augmented reality glasses on the user;
placement of contact of the augmented reality glasses on a nose of the user;
an orientation of the reality display of the augmented reality glasses to the user; and
an angle of the reality display of the augmented reality glasses to the user.

4. The computing device of claim 1, wherein modification of the at least the portion of the media that is transmitted to the reality display of the augmented reality glasses based on the position of the augmented reality glasses with respect to the user includes a modification selected from the group consisting of:
modification of a resolution of the media;
modification of a frame size of the media;
modification of a font size of text included in the media;
modification of a location of the text included in the media;
modification of an orientation of the media with respect to the reality display of the augmented reality glasses;
inclusion of textual information regarding the media; and
replacement of the at least the portion of the media or at least one other portion of the media with the textual information regarding the media.

5. The computing device of claim 1, wherein the processing circuitry is further configured to execute the operational instructions to:
determine a pattern of user behavior based on the information that is related to the position of the augmented reality glasses with respect to the user during transmission of the media to the reality display of the augmented reality glasses to be consumed by the user; and
modify other media that is transmitted to the reality display of the augmented reality glasses based on content of the other media and the pattern of user behavior.

6. The computing device of claim 1, wherein the augmented reality glasses further include a user interface configured to perform an action selected from the group consisting of: enable modification of the at least the portion of the media that is transmitted to the reality display of the augmented reality glasses, and disable modification of the at least the portion of the media that is transmitted to the reality display of the augmented reality glasses.

7. The computing device of claim 1, wherein the processing circuitry is further configured to execute the operational instructions to:
support communications, via the interface or via another interface of the computing device, with a communication system to support transmission of the media to the reality display of the augmented reality glasses to be consumed by the user, wherein the communication system is selected from the group consisting of a satellite communication system, a wireless communication system, a wired communication system, a fiber-optic communication system, and a mobile communication system.

8. A computing device comprising:
an interface configured to interface and communicate with augmented reality glasses associated with a user, wherein the augmented reality glasses include a reality display and also include a monitoring component configured to provide information that is related to a position of the augmented reality glasses with respect to the user;

memory that stores operational instructions; and processing circuitry operably coupled to the interface and to the memory, wherein the processing circuitry is configured to execute the operational instructions to:

receive the information that is related to the position of the augmented reality glasses with respect to the user from the monitoring component of the augmented reality glasses;

process the information that is related to the position of the augmented reality glasses with respect to the user to determine the position of the augmented reality glasses with respect to the user;

transmit media to the reality display of the augmented reality glasses to be consumed by the user;

modify at least a portion of the media that is transmitted to the reality display of the augmented reality glasses based on the position of the augmented reality glasses with respect to the user to facilitate contextual adjustment of rendering of the media during output via the reality display;

determine a pattern of user behavior based on the information that is related to the position of the augmented reality glasses with respect to the user during transmission of the media to the reality display of the augmented reality glasses to be consumed by the user; and modify other media that is transmitted to the reality display of the augmented reality glasses based on content of the other media and the pattern of user behavior, wherein the monitoring component of the augmented reality glasses is selected from the group consisting of:

a first at least one sensor mounted on a nosepad of the augmented reality glasses;

a second at least one sensor mounted on at least one temple tips of the augmented reality glasses;

a third at least one sensor mounted on the augmented reality glasses;

a capacitive sensor mounted on the augmented reality glasses and that is configured to detect human touch via capacitively coupling;

an ambient light sensor mounted on the augmented reality glasses that is configured to detect a level of ambient light brightness; and at least one of an accelerometer or a gyroscope mounted on the augmented reality glasses that is configured to detect orientation of the augmented reality glasses with respect to the user or the at least one of the position or the movement of the augmented reality glasses with respect to the user;

determine an anticipated change of the position of the augmented reality glasses with respect to the user based on the content of the other media and the pattern of user behavior; and modify the other media that is transmitted to the reality display of the augmented reality glasses based on the anticipated change of the position of the augmented reality glasses with respect to the user.

9. The computing device of claim 8, wherein the position of the augmented reality glasses with respect to the user corresponds to an attribute selected from the group consisting of:

a degree of pressure of the augmented reality glasses to the user;

closeness of the augmented reality glasses to the user;

placement of the augmented reality glasses on the user;

placement of contact of the augmented reality glasses on a nose of the user;

an orientation of the reality display of the augmented reality glasses to the user; and an angle of the reality display of the augmented reality glasses to the user.

10. The computing device of claim 8, wherein modification of the at least the portion of the media that is transmitted to the reality display of the augmented reality glasses based on the position of the augmented reality glasses with respect to the user includes a modification selected from the group consisting of:

modification of a resolution of the media;

modification of a frame size of the media;

modification of a font size of text included in the media;

modification of a location of the text included in the media;

modification of an orientation of the media with respect to the reality display of the augmented reality glasses;

inclusion of textual information regarding the media; and replacement of the at least the portion of the media or at least one other portion of the media with the textual information regarding the media.

11. The computing device of claim 8, wherein the processing circuitry is further configured to execute the operational instructions to:

support communications, via the interface or via another interface of the computing device, with a communication system to support transmission of the media to the reality display of the augmented reality glasses to be consumed by the user, wherein the communication system is selected from the group consisting of a satellite communication system, a wireless communication system, a wired communication system, a fiber-optic communication system, and a mobile communication system.

12. A method for execution by a computing device, the method comprising:

receiving, via an interface that is configured to interface and communicate with augmented reality glasses associated with a user, information that is related to a position of the augmented reality glasses with respect to the user from a monitoring component of the augmented reality glasses;

processing the information that is related to the position of the augmented reality glasses with respect to the user to determine the position of the augmented reality glasses with respect to the user;

transmitting, via the interface, media to a reality display of the augmented reality glasses to be consumed by the user;

modifying at least a portion of the media that is transmitted to the reality display of the augmented reality glasses based on the position of the augmented reality glasses with respect to the user to facilitate contextual adjustment of rendering of the media during output via the reality display;

determining a pattern of user behavior based on the information that is related to the position of the augmented reality glasses with respect to the user during transmission of the media to the reality display of the augmented reality glasses to be consumed by the user;

determining an anticipated change of the position of the augmented reality glasses with respect to the user based on content of other media and the pattern of user behavior; and modifying the other media that is transmitted to the reality display of the augmented reality glasses based on the anticipated change of the position of the augmented reality glasses with respect to the user.

13. The method of claim 12, wherein the monitoring component of the augmented reality glasses is selected from the group consisting of:

a first at least one sensor mounted on a nosepad of the augmented reality glasses;

a second at least one sensor mounted on at least one temple tips of the augmented reality glasses;

a third at least one sensor mounted on the augmented reality glasses;

a capacitive sensor mounted on the augmented reality glasses and that is configured to detect human touch via capacitively coupling;

an ambient light sensor mounted on the augmented reality glasses that is configured to detect a level of ambient light brightness; and at least one of an accelerometer or a gyroscope mounted on the augmented reality glasses that is configured to detect orientation of the augmented reality glasses with respect to the user or the position of the augmented reality glasses with respect to the user.

14. The method of claim 12, wherein the position of the augmented reality glasses with respect to the user corresponds an attribute selected from the group consisting of:

a degree of pressure of the augmented reality glasses to the user;

closeness of the augmented reality glasses to the user;

placement of the augmented reality glasses on the user;

placement of contact of the augmented reality glasses on a nose of the user;

an orientation of the reality display of the augmented reality glasses to the user; and an angle of the reality display of the augmented reality glasses to the user.

15. The method of claim 12, wherein modification of the at least the portion of the media that is transmitted to the reality display of the augmented reality glasses based on the position of the augmented reality glasses with respect to the user includes a modification selected from the group consisting of:

modification of a resolution of the media;

modification of a frame size of the media;

modification of a font size of text included in the media;

modification of a location of the text included in the media;

modification of an orientation of the media with respect to the reality display of the augmented reality glasses;

inclusion of textual information regarding the media; and replacement of the at least the portion of the media or at least one other portion of the media with the textual information regarding the media.

16. The method of claim 12 further comprising:

determining a pattern of user behavior based on the information that is related to the position of the augmented reality glasses with respect to the user during transmission of the media to the reality display of the augmented reality glasses to be consumed by the user; and modifying other media that is transmitted to the reality display of the augmented reality glasses based on content of the other media and the pattern of user behavior.

17. The method of claim 12 further comprising:

supporting communications, via the interface or via another interface of the computing device, with a communication system to support transmission of the media to the reality display of the augmented reality glasses to be consumed by the user, wherein the communication system is selected from the group consisting of a satellite communication system, a wireless communication system, a wired communication system, a fiber-optic communication system, and a mobile communication system.

* * * * *